May 31, 1938.  E. A. ZADIG  2,119,145

DEVICE FOR TESTING AUTOMOBILE BRAKES

Filed Feb. 20, 1936

INVENTOR
Ernest A. Zadig
BY
Emery, Booth, Varney, Whittemore
ATTORNEY

Patented May 31, 1938

2,119,145

UNITED STATES PATENT OFFICE 2,119,145

DEVICE FOR TESTING AUTOMOBILE BRAKES

Ernest A. Zadig, New York, N. Y.

Application February 20, 1936, Serial No. 64,820

1 Claim. (Cl. 264—1)

This invention relates to devices for testing automobile brakes.

It is an object of the invention to provide a very simple inexpensive device with which the individual automobile owner can test the efficiency of his brakes at any time while driving his car.

Other objects and advantages of the invention will appear hereinafter.

Figure 1:
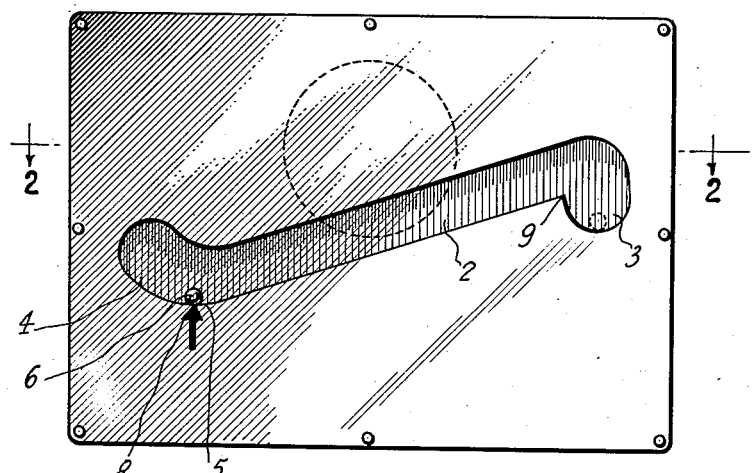
Figure 2:
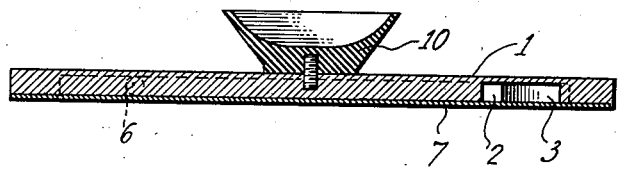

A preferred embodiment of the invention selected for purposes of illustration is shown in the accompanying drawing, in which, Figure 1 is a front elevation of the device, and Figure 2 is a section on the line 2—2 of Figure 1.

When brakes are applied to a moving automobile, its velocity is decelerated (negatively accelerated) at a rate dependent on the efficiency of the brakes and the force with which they are applied. Objects within the automobile are ordinarily decelerated with it, due to physical attachment or friction, but it will be understood that an object not so restrained will tend to continue to move forward without deceleration due to its inertia. If such an object can be made to do work, the work done will be a measure of the deceleration. These physical principles are availed of in the device to be described.

Referring to the drawing, the device comprises a flat panel 1 of any suitable material such, for example, as wood, heavy cardboard, metal or molded plastic material. A groove 2 is formed in the panel, which said groove is preferably inclined with respect to the upper and lower edges of the panel. At its right hand end, the groove terminates in a recess 3. At its left hand end the groove is preferably inclined, as at 4, for a short distance in the opposite direction to the remainder of the groove, and the two inclined portions are connected by a smoothly curved portion 5. Within the groove is mounted a small movable object such as a ball bearing 6, and the said object may be conveniently retained in the groove by a panel 7 of transparent material such as clear pyroxylin or glass attached to the panel 1 by any suitable means.

Preferably an arrow or other suitable indicating mark 8 is printed on the panel 1 to indicate the proper rest position for the ball 6, the inclination of the groove 2 from the arrow point to the edge 9 being so arranged that the work done by the ball in rolling up the incline and over the edge 9 will indicate whether the action of the brakes is producing the required deceleration.

State laws usually require that brakes must be adequate to bring a car to a stop from a given speed in a given distance. This requirement implies, of course, a certain determinable rate of deceleration. This being known, the inclination of the groove 2 may be determined either by calculation or empirically, the inclination being sufficient to just permit the ball 6 to roll over the edge 9 when the required rate of deceleration is attained.

The device may be secured to the car in any suitable manner, but it is convenient to use a rubber suction cup 10. The device is to be mounted substantially parallel to the direction of movement of the car, and a convenient position is on the window adjacent the driver's seat. When secured with a suction cup it is a simple matter to twist the panel to return the ball to its rest position from the recess 3.

When the panel is attached, it is adjusted until the ball 6 rests immediately over the arrow, which indicates that the groove 2 is properly inclined. If the panel is rectangular, and the groove is properly inclined with respect to the upper and lower edges, these edges will also indicate the proper adjustment, but the arrow 8 is a positive indication irrespective of the shape of the panel.

It will be understood that while the device has been described particularly for testing deceleration, it may also be used for testing acceleration by reversing the direction of the groove.

It will be understood that the invention may be variously modified and embodied within the scope of the subjoined claim.

I claim as my invention:

A device for testing automobile brakes, comprising, a member having a surface therein, said surface having two oppositely inclined portions connected by a smoothly curved portion, one of said inclined portions being longer than the other and being straight, a ball adapted to roll along said surface, but normally resting in said smoothly curved portion, and means providing a visual indication of the proper resting position of said ball along said curved surface in order to provide a proper inclination of the straight portion of said inclined surfaces for testing purposes.

ERNEST A. ZADIG.